Dec. 16, 1958 P. KATZ 2,864,564

PORTABLE MAGNETIC RECORDER

Filed Feb. 18, 1954 6 Sheets-Sheet 1

INVENTOR
PETER KATZ
BY J. B. Burke
ATTORNEY

Dec. 16, 1958 P. KATZ 2,864,564

PORTABLE MAGNETIC RECORDER

Filed Feb. 18, 1954 6 Sheets-Sheet 2

INVENTOR
PETER KATZ
BY J. B. Burke
ATTORNEY

Dec. 16, 1958 P. KATZ 2,864,564

PORTABLE MAGNETIC RECORDER

Filed Feb. 18, 1954 6 Sheets-Sheet 3

INVENTOR
PETER KATZ
BY J. B. Burke
ATTORNEY

INVENTOR
PETER KATZ
BY J. B. Burke
ATTORNEY

PORTABLE MAGNETIC RECORDER

Filed Feb. 18, 1954 6 Sheets-Sheet 5

INVENTOR
PETER KATZ
BY J. B. Burke
ATTORNEY

Dec. 16, 1958 P. KATZ 2,864,564

PORTABLE MAGNETIC RECORDER

Filed Feb. 18, 1954 6 Sheets-Sheet 6

INVENTOR
PETER KATZ
BY J. B. Burke
ATTORNEY 2,864,564

PORTABLE MAGNETIC RECORDER

Peter Katz, Baldwin, N. Y., assignor to American Measuring Instruments Corp., Long Island City, N. Y., a corporation of New York Application February 18, 1954, Serial No. 411,170

5 Claims. (Cl. 242—55.12)

This invention relates generally to magnetic sound recording and reproducing devices, and particularly relates to a magnetic tape recorder and reproducer.

The tape recorder of the present invention is self-contained and does not require external sources of power either to advance the magnetic recording medium, such as a tape, or to supply electric power to an electronic amplifier or to the magnetic recording and pick-up or reproducing head. Nevertheless, the recorder of the invention is of a size so that it may conveniently be carried in the pocket of the user.

It is, accordingly, an object of the invention to provide a light-weight, small recorder of sound which does not require external power sources for its operation.

A further object of the invention is to provide a pocket tape recorder which utilizes a single slider for conditioning the recorder to rewind the magnetic tape, to disconnect the electronic amplifier and the power for moving the tape, to play back the previously recorded sound and to record sound on the tape.

Another object of the invention is to provide a spring motor for advancing the magnetic tape either to record sound on the tape, to rewind the tape or to play back the previously recorded sound, the motor requiring a minimum of space.

Still a further object of the invention is to provide a recorder of the type referred to which makes it possible to rewind the tape at a much higher speed than the sound is recorded on the tape.

These and other objects of the invention will become more apparent as the description proceeds, taken in connection with the accompanying drawings, wherein.

Figure 1:
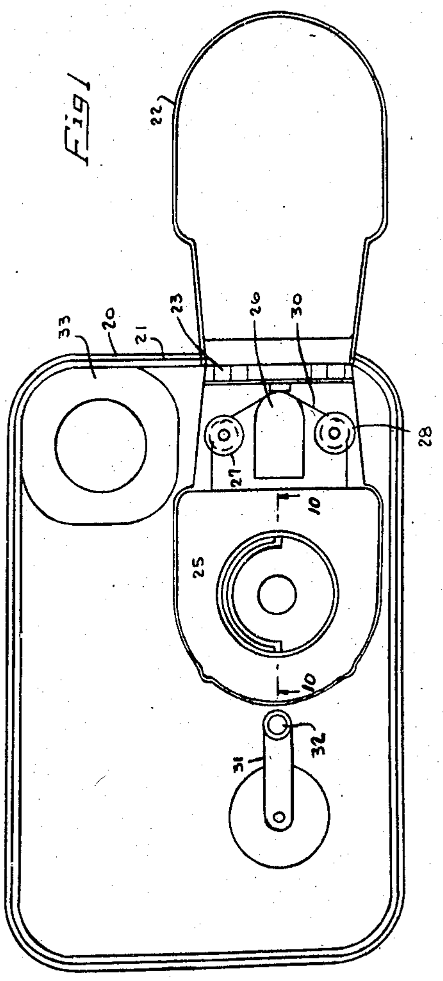
Fig. 1 is a plan view of the pocket tape recorder of the invention.
Figure 3:
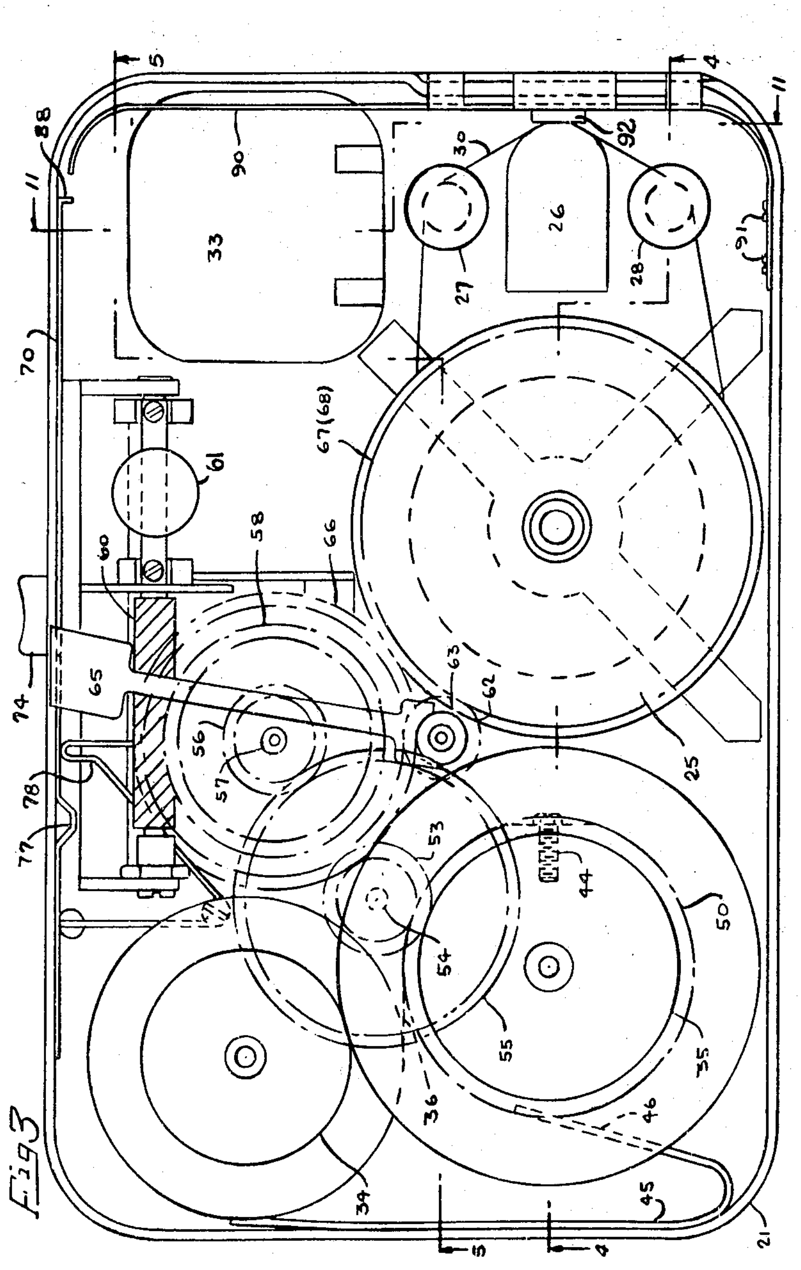
Fig. 3 is a plan view of the recorder, parts being removed, to illustrate the mechanism.
Figure 4:
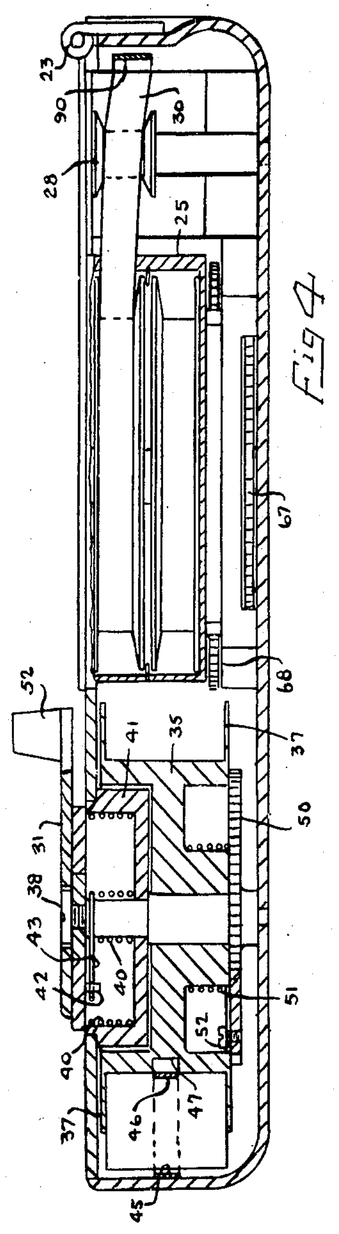
Figure 5:
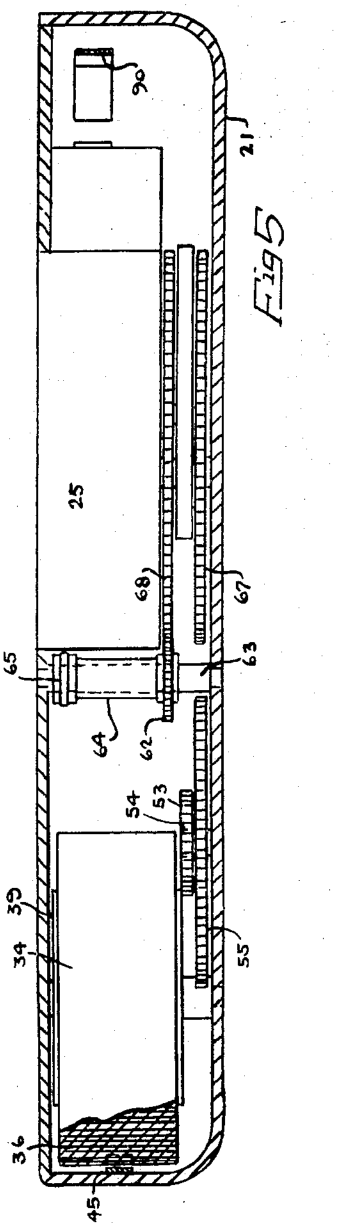
Figures 6, 7:
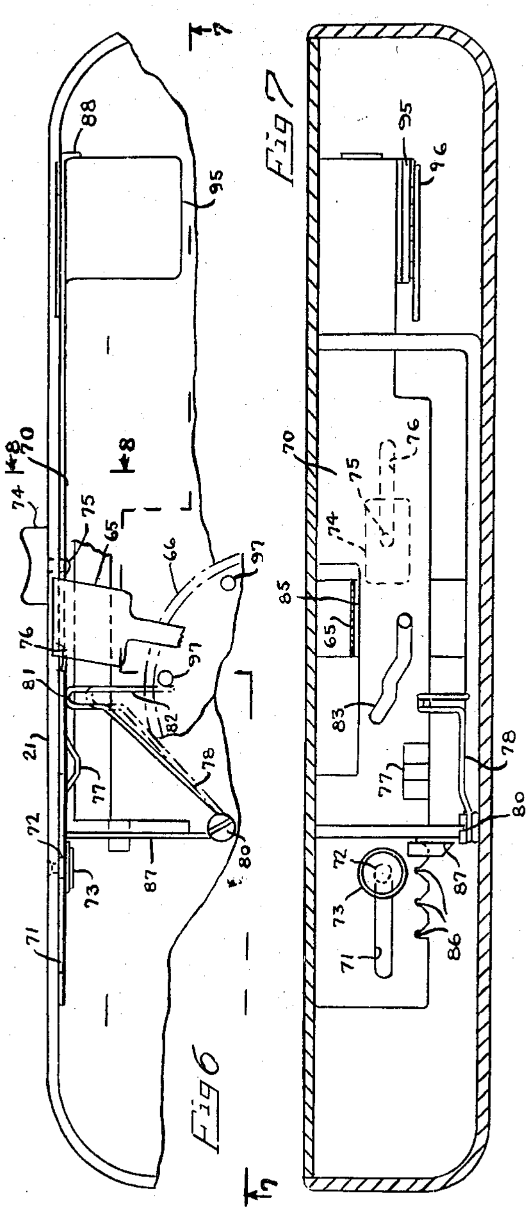
Figure 9:
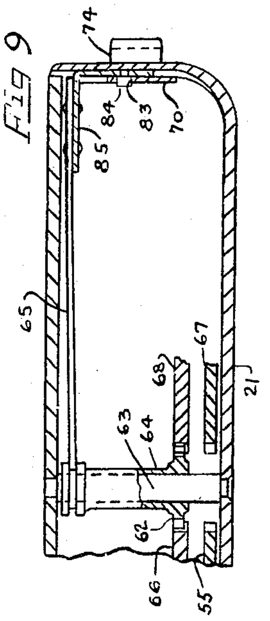
Figure 8:
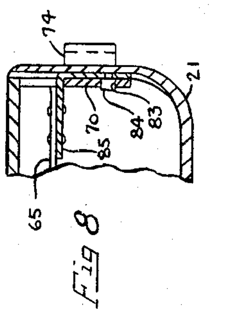
Figure 10:
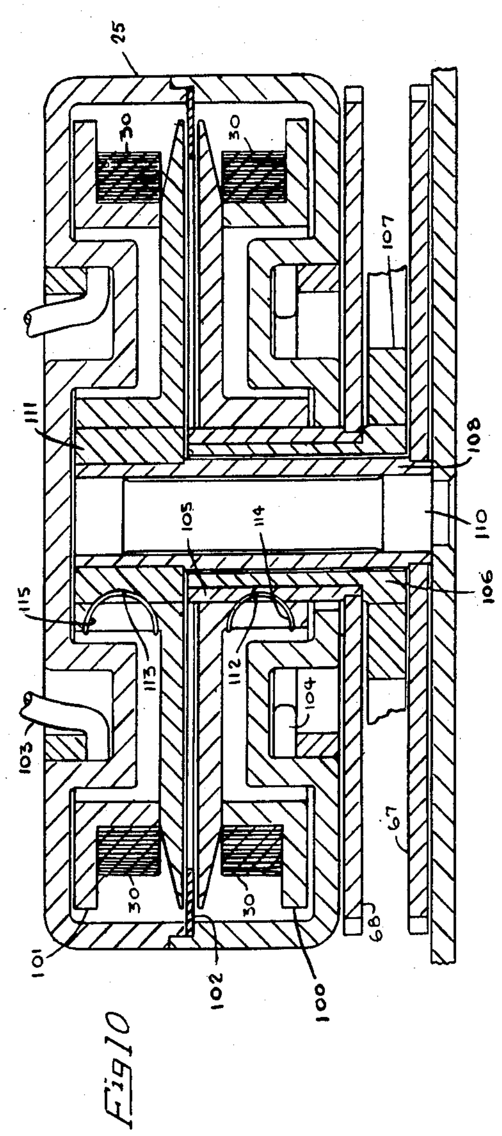
Figure 11:
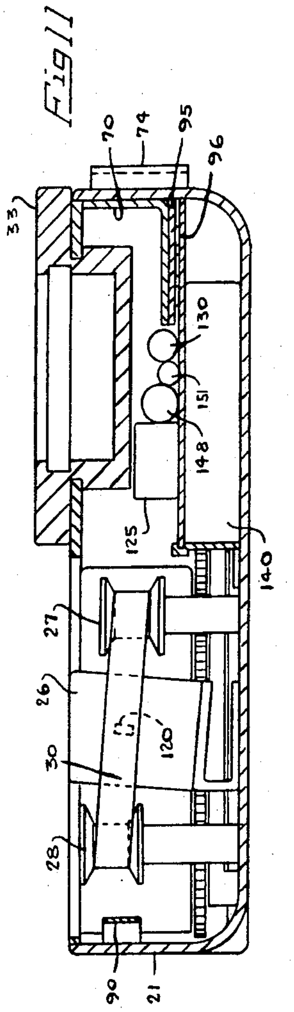
Figure 12:
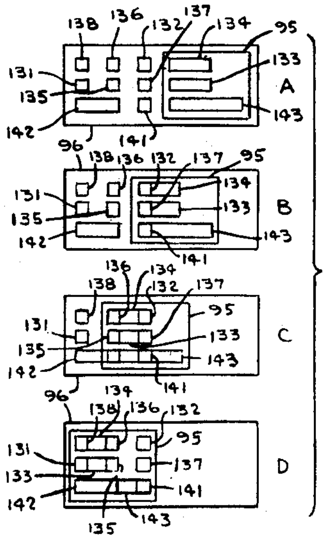
Figure 13:
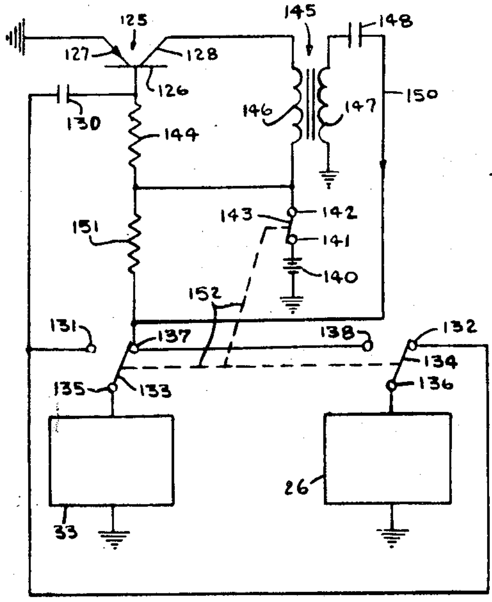

Figs. 4 and 5 are sectional views taken respectively on lines 4—4 and 5—5 of Fig. 3;

Fig. 6 is a fragmentary top plan view illustrating the movable slider which controls the various operating phases of the recorder;

Fig. 7 is a sectional view taken on line 7—7 of Fig. 6;

Fig. 8 is a cross-sectional view taken on line 8—8 of Fig. 6;

Fig. 9 is a fragmentary view, on an enlarged scale, similar to Fig. 5, and illustrating a shiftable gear which controls the direction of movement of the magnetic tape;

Fig. 10 is a cross-sectional view taken on line 10—10 of Fig. 1 and illustrating the construction of the tape magazine;

Fig. 11 is a sectional view taken on line 11—11 of Fig. 3 and illustrating the magnetic recording and pick-up head and associated electric circuit components;

Fig. 12 is a schematic view illustrating the positions of the movable slider with respect to fixed contacts to provide electric connection required by the various functions or operating phases of the recorder; and Fig. 13 is an electric circuit diagram illustrating a transistor utilized as an amplifier, a microphone or speaker, a recording or reproducing head and the switches for conditioning the recorder for its various functions.

Figure 2:
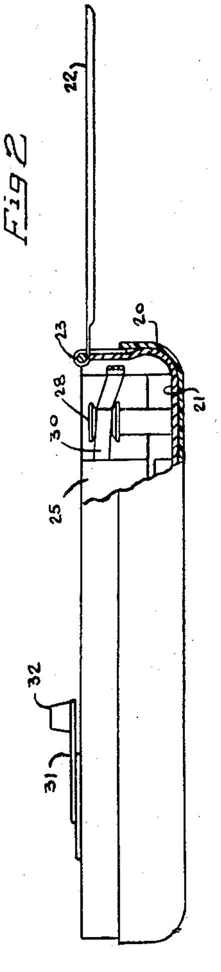
Fig. 2 is a side elevational view of the recorder of Fig. 1, parts being broken away.

Referring now to the drawings wherein like elements have been designated by the same reference characters, and particularly to Figs. 1 to 3, there is illustrated a sound recorder in accordance with the present invention utilizing a magnetic tape. The sound recorder comprises an outer housing 20 which preferably is moulded of a plastic material and which may have rounded corners as shown. A plastic cover 22 is hinged to the case by a hinge 23. The cover 22 may be used for suspending the recorder. Disposed on top of the housing is a magazine 25 for the magnetic tape, a magnetic head 26 which serves both for recording sound and for reproducing it again and a pair of guide rollers 27, 28 for the magnetic tape 30. The recorder further includes a crank 31 having a handle 32 for winding a spring motor which serves the purpose of advancing the tape and a microphone 33 which may also be used as a speaker for reproducing the recorded sound.

The magnetic tape 30 is advanced in either direction by means of a spring motor shown particularly in Figs. 3 to 5, to which reference is now made. The spring motor includes two drums 34 and 35 about which the power spring may be wound. The power spring may be a leaf spring 36 in the shape of a tape. In the position shown in Fig. 3 the power spring has been unwound from the power output drum 35 and wound on the storage drum 34 so that no more spring power is available. It will be noted that the drum 35 is provided with flanges 37 for retaining the spring 36. The drum 34 has relatively smaller flanges 39 but the flanges 37 will retain the power spring when it is wound on storage drum 34 as illustrated in Fig. 3. The two drums 34 and 35 are positioned as closely together as possible to reduce the space requirements of the recorder. As the power spring unwinds from one drum and winds up on the other drum, the diameter of one drum decreases while that of the other increases. This makes it possible to position the two drums closely together as shown in Fig. 3, depending on the outer diameter of the drums and on the length and thickness of the power spring.

The power output drum 35 may be rotated by the crank 31 in a clockwise direction. The crank 31 is freely rotatable on the shaft 38 to which the drum 35 is secured. However, a driving connection between the crank 31 and the drum 35 is effected by a coupling spring 40 having an inner substantially cylindrical portion pressing against the inner annular recess of a bushing 41 which forms a journal for the shaft 38. Hence, when the crank 31 is rotated in a clockwise direction, a pin 42 on the crank engages the free end portion 43 of the coupling spring 40. Due to the frictional resistance of the coupling spring 40 with respect to the bushing 41, the diameter of the inner portion of the spring decreases upon further rotation of the crank and the coupling spring 40 is coupled to the shaft 38 which is consequently connected to the crank. Accordingly, the power spring 36 can now be wound from the drum 34 to the drum 35. The power spring 36 is secured to the drum by a screw 44. The pin 42 is tapered so that the spring portion 43 will slide over the pin when the crank is accidentally rotated in the reverse direction.

Breaking of the power spring 36 by accidental overwinding of the crank or by unwinding of the spring from drum 35 and the drum 34 is prevented in accordance with the invention by a further leaf spring 45 having a bent portion 46, the tip of which is engageable with a recess 47 in the drum 35. When the power spring 36 is almost unwound, the recess 47 is uncovered so that the spring tip can snap into the recess to arrest further counter-clockwise rotation of drum 35. The other end 47 of the leaf spring 45 serves the same purpose of arresting counter-clockwise rotation of drum 34 when the power spring has almost completely been unwound from the storage drum.

Let it now be assumed that the spring motor has been wound in the manner described and is ready for use. Hence a driving connection between the drum 35, which now unwinds in a counterclockwise direction, and the reels for the tape 30 in the magazine 25 is required. To this end a gear 50 is mounted on the shaft 38 and may be driven thereby when the drum 35 is rotated in a counter-clockwise direction to deliver power, but not when the drum is rotated by its crank in a clockwise direction. This is accomplished by means of a coupling spring 51 having its end secured by screw 52 to gear 50. The spring 51 is wound about an annular recess of the drum 35, as shown, to provide the desired driving connection.

The gear 50 meshes with a pinion 53 on a shaft 54 which also bears a gear 55. The gear 55, in turn, engages a pinion 56 on a shaft 57 which also bears a worm gear 58 engaging a worm 60. The worm 60 drives a speed governor 61 for controlling the speed of the spring motor, as is conventional. The gear 55 further is engageable with a pinion 62 freely rotatable on its shaft 63 and which may be moved in an axial direction along its shaft by a sleeve 64 controlled by means of a spring lever 65 in a manner to be more fully described hereinafter. The pinion 62 not only is engageable with gear 55 but also with a gear 66 on the shaft 57, depending on the position of the pinion. Finally the pinion 62 is engageable with either gear 67 or 68 for selectively driving one of the two reels for the tape as will be more fully described hereinafter.

The recorder of the invention has four different phases or functions: a first phase for rewinding the tape 30, a second phase where both the spring motor and the electronic circuit are disconnected, a third phase for playing back the previously recorded sound, and the fourth phase for recording sound on the tape. The recorder may be conditioned to operate in any of the four phases by means of a single slider 70 now to be described in connection with Figs. 6 to 8. The slider 70 is provided with a slot 71 through which extends a rivet 72 secured to the cover 21 and having a button 73 on its free end for retaining the slider. An actuating button 74 extends from the cover 21 and is secured to the slider 70 by means of a rivet or pin 75. A slot 76 in the cover 21 permits the slider 70 to move by means of a button 74 along the side wall of the cover into four positions corresponding to the four operating phases of the recorder.

The slider 70 is provided with a projection or nose 77 adapted to cooperate with a spring 78 secured to the housing by a screw 80. To this end the spring 78 has a bent portion 81 which will be displaced when it engages the nose 77 and a free end 82 which serves a purpose to be explained hereinafter. The slider 70 has a slot 83 shaped to provide a curve or cam and through which extends a pin 84 secured to an L-shaped member 85 which in turn bears the spring lever 65 controlling the position of pinion 62. Hence movement of the slider will raise and lower the L-member 85 by virtue of its pin 84 to raise and lower the spring lever 65 and hence the pinion 62.

The slider has four recesses or notches 86 with which the other free end 87 of the spring 78 may engage to lock the slider in any one of its four positions. One end of the slider 70 is bent over at 88. Hence in the extreme position of the slider 70, its bent portion 88 will engage a spring 90 (see Fig. 3) to push it towards the housing wall, the other end of the spring being secured to the housing by screws 91. This spring 90 bears a pressure member 92 which may consist of a felt pad to press the tape 30 against the magnetic head 26. Thus, when the slider pushed the spring 90 against the housing wall, the pressure member 92 will no longer urge the tape against the magnetic head to reduce wear and tear on the tape when it is being rewound.

The slider 70 also bears a contact plate 95 which cooperates with a fixed contact plate 96 to open and close certain electric contacts as will be explained later in connection with Figs. 12 and 13. The operation of the slider 70 will also be more fully described hereinafter.

If the spring 81 is deflected by the nose 77 into the position shown in dotted lines in Fig. 6, the free end 82 of the spring 78 interferes with one of the eight pins 97 extending from the gear 66 to arrest the spring motor.

The magazine 25 for the tape 30, as shown particularly in Fig. 10, is symmetrically arranged and includes two reels 100 and 101 concentrically arranged one above the other on a common axis. Disposed between the two reels and secured to the parts of the magazine is an annular member 102 which serves the purpose of preventing the tape from sliding off one of the reels. Since the magazine is symmetrically arranged it is possible to record sound either on the upper or on the lower portion of the tape simply by removing the magazine and reversing it before it is put back again. In this case, after the second sound track has been recorded, the tape is automatically rewound so that it is possible, after recording of the second sound track, to play back the first sound track without rewinding the tape. In order to facilitate removing of the magazine, the same is provided with a semi-circular lever 103 on one side and with a similar lever 104 on its other side.

The two reels 100 and 101 are mounted in such a manner that each may be rotated independently from the other to prevent rotation of one reel when the other is driven due to friction. Hence, each of the two reel driving gears 67 and 68 is mounted independently. The gear 68 is secured to a bushing 105 which is journalled in an inner bushing 106 which, in turn, is secured to a ring 107 serving as a bridge.

The gear 67 is secured to a bushing 108 which rotates with the shaft 110. Between the bushings 106 and 108 a space is provided to prevent friction. Mounted on the bushing 108 is a sleeve 111. The bushing 105 and the sleeve 111 are each provided with grooves 112 and 113 respectively for receiving springs 114 and 115 which transmit rotary motions of the gears 67 and 68 to the reels. The construction of the springs 114 and 115 is such that they permit radial motions when the magazine is being removed. On the other hand, rotational forces do not cause radial movements of the springs because they tend to shear the spring.

As shown particularly in Fig. 11 the magnetic tape 30 moves at an angle from guide roller 27 to guide roller 28 because the tape has to move from the upper reel 101 to the lower reel 100 or vice versa. Accordingly, the magnetic head 26 is mounted at an angle too so that the magnetic gap 120 of the head is at right angles to the edges of the tape 30. This construction makes it possible to house the magazine and the magnetic head in a minimum of space without causing distortions of the recorded or reproduced sound.

Reference is now made to the electric circuit diagram of Fig. 13. The recorder of the invention preferably utilizes a junction transistor 125 as an amplifier. The junction transistor may be of the PNP type as indicated but it is to be understood that an NPN transistor may be used instead; however, in the latter case the polarity of the battery must be reversed as is well understood. The transistor 125 includes a base 126, an emitter 127 and a collector 128 which may consist of soldered or sweated connections to the P, N and P zones of the semiconducting crystal. Hence base, emitter and collector are in low-resistance or chemic contact with the respective zones of the crystal. The transistor is preferably, but not necessarily, connected as a grounder emitter amplifier and hence the input signal is coupled to the base through a blocking capacitor 130 which may have a low capacitance to attenuate the low frequency portions of the input or audio signal. The input signal is impressed through either terminal 131 or terminal 132 or capacitor 130. By means of movable contacts 133 and 134 fixed terminal 135 may be connected to either fixed contact 137 or 131, and fixed terminal 136 may be connected to either fixed contact 132 or 138. Contact 135 is connected to the microphone or speaker 33 and contact 136 to the recording or reproducing head 26; hence, either of the two may be connected to the input capacitor 130.

The input circuit is completed through a battery 140 having its positive terminal grounded while its negative terminal is connected through fixed contacts 141, 142 and a movable contact 143 to a resistor 144 connected to the base. Hence the required base-emitter bias voltage or current is provided.

The output circuit includes an output transformer 145 having a primary winding 146 connected between terminal 142 and the collector, and a secondary winding 147 having one terminal grounded while its other terminal is connected to blocking capacitor 148. By lead 150 capacitor 148 is connected to a resistor 151 connected between terminal 137 and resistor 144. The three movable contacts 133, 134 and 143 are movable in unison as indicated schematically at 152.

In Figs. 6 and 7 the four positions of the slider 70 will now be described and the various operating phases controlled thereby. Let it be assumed that the slider is in its outermost right position. It will further be assumed that the power spring 36 has been wound in the manner previously explained on the drum 35. In this position of the slider the recorder is conditioned to rewind the tape. The right hand portion 88 of the slider now presses against the spring 90 thus disengaging the felt pad 92 from the magnetic head 26 whereupon the tape 30 is free to move. At the same time the pin 84 is in the uppermost position of slot 83 and the spring lever 65 displaces the pinion 62 into its uppermost position so that pinion 62 engages gears 66 and 68. Accordingly, a driving connection is established from drum 35 to gear 50 (in the manner previously explained by means of coupling spring 51), to pinions 53 and 55, from 55 to 56 and 66, gear 66 to pinion 62 and gear 68. Gear 68 drives reel 100 as previously explained.

The rewind speed may be three times as large as the recording speed which may amount to 1.5 inches per second. As shown in Fig.12A, the movable contacts 134, 133, and 143, are not in engagement with any of the fixed contacts 132, 136, 138, 137, 135, 131, 141 and 142 and hence the electronic circuit shown in Fig. 13 is deenergized. The magnetic tape may thus be removed.

Assuming now that the slider 70 is moved to the left into its next position called "off" wherein the spring motor is arrested and the electronic motor is still deenergized. The slider portion 88 is now out of engagement with the spring 90 so that the felt pad 92 again presses the tape against the magnetic head 26. The pinion 62 now moves into its neutral position because the pin 84 is moved into its intermediate position due to the shape of the slot 83. The nose 77 now engages the spring portion 81 so that the free end 82 of the spring 78 interferes with the pins 97 on the gear 66. This will arrest the spring motor which is coupled to gear 66 through pinion 53 and gear 50. As shown in Fig. 12B, the movable contacts 134, 143, 133 of plate 95 are respectively in engagement with fixed contacts 132, 137 and 141 so that the electronic circuit is still disconnected.

When the slider is moved left again into its next position, the recorder is conditioned to play back the sound on the tape previously recorded thereon. The projection 77 disengages the spring portion 81 to permit the gear 66 to rotate freely. At the same time the pin 84 is pushed into its lowest position which in turn lowers the spring lever 65 to lower the pinion gear 62. The pinion 62 engages gears 55 and 67 so that a driving connection is established from drum 35, gear 50, pinion 53, which drives gear 55 through the common shaft 54, pinion 62 and gear 67. Gear 67 thus drives reel 101 to play back sound previously recorded.

As shown in Fig. 12C the movable contact 134 electrically connects fixed contacts 132, 136, the movable contact 133 connects fixed contacts 137, 135 and the movable contact 143 connects fixed contacts 141, 142 as shown in Fig. 13. Hence, the audio signal recorded on the tape is picked up by the reproducing head 26 and impressed through contacts 136, 134, 132 on coupling capacitor 130. Accordingly, the signal is coupled to the base of the transistor. The output signal is developed across the output transformer 145 which serves the purpose of matching the relatively high output impedance of a junction transistor to the relatively low input impedance of a microphone or speaker. The amplified output signal is now impressed through lead 150, contacts 137, 133, 135 on the microphone 33 which serves as a speaker.

When the slider 70 is moved into its outermost left position, the pinion 62 remains in the same position as previously described and the recorder is conditioned to record sound on the tape. The position of the movable contact plate 95 is as shown in Fig. 12D and the movable contact 134 is in engagement with fixed contacts 136, 138, the movable contact 133 is in engagement with fixed contacts 135, 131 and the movable contact 143 is still in engagement with fixed contacts 141, 142. Consequently, as will be evident from Fig. 13 the microphone 33 is coupled to the transistor base and the amplified output signal is connected to the recording head 26. The current flowing from battery 140 through resistor 151, contacts 138, 134, 136 to the recording head serves to supply the recording bias current to the magnetic head.

It may be mentioned that the arrangement of the electronic components is shown in Fig. 11 including transistor 125, resistor 151, capacitors 130, 148 and battery 140.

The recorder of the invention may be operated as follows.

In order to record sound a new magazine with fresh or erased tape is put into the recorder. The spring motor is wound fully and the slider is set to record. After the tape has been recorded, the motor is wound again and the slider is set to rewind the tape. In order to play back the recorded sound the motor is first wound again and the slider is set to play back the sound. Finally the slider is moved to the off position. However, as previously pointed out, it is also feasible to record a sound track both on the upper and lower portions of the tape simply by removing, turning and replacing the tape magazine. In that case the sound track recorded first may be played back after turning the magazine without rewinding.

Since certain changes may be made in the above article and different embodiments of the invention could be made without departing from the scope thereof, it is intended that all matter contained in the above description shall be interpreted as illustrative and not in a limiting sense.

Having thus described the invention, what I claim as new and desire to be secured by Letters Patent, is as follows:

1. In a portable magnetic recorder, in combination: a spring motor, a pair of reels for carrying a magnetic medium, a first gear train for connecting said motor to said reels to drive them at one speed in one direction while recording and reproducing sound, a second gear train for connecting said motor to said reels to drive them in the opposite direction at a greater speed for rewinding the medium, a gear common to said first and second gear train for selectively driving said reels in either one of said directions, a manually operable slider having a plurality of predetermined positions, a slot in said slider having a predetermined shape, a member cooperating with said slot and movable in one direction in response to movements of said slider and variations in the shape of said slot, and a flexible element interconnecting said member and said gear for selectively causing engagement of said gear with said first gear train and with said second gear train and for disengaging said member from either gear train.

2. In a portable magnetic recorder, in combination: a spring motor, a pair of reels for a magnetic medium, a first gear train for connecting said motor to said reels to drive them in one direction while recording and reproducing sound, a second gear train for connecting said motor to said reels to drive them in the opposite direction at a greater speed for rewinding the medium, a gear common to said first and second gear train for selectively driving said reels in either one of said directions, said gear being slidably mounted on a shaft, a manually operable slider having a plurality of predetermined positions and movable at rght angle to said shaft, a slot in said slider varying in shape along the direction of said shaft, a member extending through said slot, whereby said member is moved in a direction parallel to said shaft in response to movements of said slider, and a spring lever interconnecting said member and said gear for selectively causing engagement of said gear with said first gear train and with said second gear train and for disengaging it from either gear train.

3. A spring motor comprising a first drum and a second drum, each being mounted to be freely rotatable, a power spring adapted to be wound from one of said drums to the other, said drums being spaced a distance which substantially does not exceed the distance needed to accommodate said power spring between said drums during winding or unwinding thereof, a flange on said first drum for supporting said power spring when wound on either one of said drums, and a recess in the spring supporting surface of each of said drums, a second spring having free ends yieldably pressing individually against said recesses, whereby one of the ends of said second spring will engage with one of said recesses when said power spring has unwound therefrom to arrest the associated drum.

4. A spring motor comprising a first drum and a second drum, each being mounted to be freely rotatable, a power spring adapted to be wound from one of said drums to the other, a flange on said first drum for supporting said power spring when wound on either of said drums, a recess in the spring supporting surface of each of said drums, a second spring having free ends yieldably pressing individually against said recesses, whereby one of the ends of said second spring will engage with one of said recesses when said power spring has unwound therefrom to arrest the associated drum, a manually operable handle for winding said first drum, a third spring means for providing a driving connection between said handle and said first drum only upon rotation of said handle in a predetermined direction, a gear for transmitting power from said drums, and a fourth spring means for providing a driving connection between said first drum and said gear only upon rotation of said first drum in the opposite direction.

5. A spring motor comprising a first drum and a second drum, each being mounted to be freely rotatable, a power spring adapted to be wound from one of said drums to the other, said drums being spaced a distance which substantially does not exceed the distance needed to accommodate said power spring between said drums, during winding or unwinding thereof, a flange on said first drum for supporting said power spring when wound on either one of said drums, a recess in the spring supporting surface of each of said drums, a second spring having free ends yieldably pressing individually against said recesses whereby one of the ends of said second spring will engage with one of said recesses when said power spring has unwound therefrom to arrest the associated drum, a manually operable handle for winding said first drum, a first coil spring for providing a driving connection between said handle and said first drum only upon rotation of said handle in a predetermined direction, a gear for transmitting power from said drums, and a second coil spring for providing a driving connection between said first drum and said gear only upon rotation of said first drum in the opposite direction.

References Cited in the file of this patent

UNITED STATES PATENTS

| | | |
|---|---|---|
| 2,063,799 | Fornelius | Dec. 8, 1936 |
| 2,535,478 | Arndt et al. | Dec. 26, 1950 |
| 2,535,497 | Jones | Dec. 26, 1950 |
| 2,555,643 | Harrison | June 5, 1951 |
| 2,622,700 | Geyer | Dec. 23, 1952 |
| 2,677,727 | Haynes | May 4, 1954 |
| 2,713,618 | McNabb | July 19, 1955 |
| 2,732,437 | Travis | Jan. 24, 1956 |